(12) United States Patent
Kobayashi et al.

(10) Patent No.: US 8,908,258 B2
(45) Date of Patent: Dec. 9, 2014

(54) ELECTROPHORESIS DEVICE AND DISPLAY UNIT

(71) Applicant: Sony Corporation, Tokyo (JP)

(72) Inventors: Ken Kobayashi, Kanagawa (JP); Hidehiko Takanashi, Kanagawa (JP); Yuriko Kaino, Kanagawa (JP); Aya Shuto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/915,726

(22) Filed: Jun. 12, 2013

(65) Prior Publication Data

US 2013/0335810 A1    Dec. 19, 2013

(30) Foreign Application Priority Data

Jun. 19, 2012   (JP) ................. 2012-137587

(51) Int. Cl.
   *G02B 26/00*   (2006.01)
   *G02F 1/133*   (2006.01)
   *G03G 13/00*   (2006.01)
   *G09G 3/34*   (2006.01)
   *G02F 1/167*   (2006.01)
   *D04H 1/72*   (2012.01)

(52) U.S. Cl.
   CPC ............. *G02F 1/167* (2013.01); *D04H 1/72* (2013.01); *G02F 2001/1678* (2013.01)
   USPC .......................................... 359/296

(58) Field of Classification Search
   CPC ........... G02F 1/03; G02F 1/133; G02B 26/26; G02B 26/00; G02B 26/08
   USPC ......... 359/296, 253–254, 245, 290–291, 298; 349/33; 345/49, 105, 107; 430/31, 32
   See application file for complete search history.

(56) References Cited

U.S. PATENT DOCUMENTS

2011/0310465 A1*  12/2011  Takanashi et al. ............. 359/296
2012/0099182 A1*  4/2012   Ogawa ........................... 359/296

FOREIGN PATENT DOCUMENTS

| JP | 50-015115 | 6/1975 |
| JP | 50-015120 | 6/1975 |
| JP | 2002-244163 A | 8/2002 |
| JP | 2005-107146 A | 4/2005 |
| JP | 2005-128143 A | 5/2005 |
| JP | 4188091 B2 | 9/2008 |

* cited by examiner

*Primary Examiner* — Dawayne A Pinkney
(74) *Attorney, Agent, or Firm* — Wolf, Greenfield & Sacks, P.C.

(57) ABSTRACT

There are provided an electrophoresis device and a display unit which are capable of realizing high contrast. The electrophoresis device includes a plurality of electrophoretic particles and a porous layer that are contained in an insulating liquid, the porous layer being formed using a fibrous structure including a plurality of non-migrating particles. An average particle size of the electrophoretic particles is equal to or less than one-fifth of an average pore size of the porous layer.

16 Claims, 3 Drawing Sheets

ELECTROPHORESIS DEVICE AND DISPLAY UNIT

CROSS REFERENCE TO RELATED APPLICATIONS

This application claims priority to Japanese Priority Patent Application JP 2012-137587, filed in the Japan Patent Office on Jun. 19, 2012, the entire content of which is hereby incorporated by reference.

BACKGROUND

The disclosure relates to an electrophoresis device in which a plurality of electrophoretic particles are contained in an insulating liquid, and to a display unit including the electrophoresis device.

In recent years, low-power display units (displays) with high image quality have been in increasing demand, as mobile equipment represented by portable telephones and portable information terminals has become widespread. Above all, portable information terminals provided for the purpose of reading character information for a long time (namely, electronic book terminals) have been attracting attention recently since the appearance of distribution service of electronic books. Therefore, displays having display quality suitable for this purpose have been desired.

Displays such as a cholesteric liquid crystal display, an electrophoretic display, an electric-redox-type display, and a twisting ball display have been proposed as displays for reading purpose. Above all, a reflection-type display is desirable. This is because, in this type of display, bright display is performed using reflection (scattering) of external light in a manner similar to paper and thus, display quality close to that of paper is achieved. In addition, since backlight is unnecessary, power consumption is low.

A strong candidate of the reflection-type display is an electrophoretic display that produces contrast using an electrophoretic phenomenon. The reason is that the electrophoretic display is superior in rapid response while consuming low power. Thus, various studies have been made for a display method of the electrophoretic display.

Specifically, there has been proposed a method in which two kinds of charged particles which are different in optical reflection property are dispersed in an insulating liquid, and the charged particles are moved in response to an electric field (for example, see Japanese Examined Patent Publication No. S50-015115 and Japanese Patent No. 4188091). In this type of method, the two kinds of charged particles are of opposite polarity and therefore, distribution of the charged particles changes in response to an electric field.

In addition, there has been proposed a method in which a porous layer is arranged and charged particles are dispersed in an insulating liquid, and the charged particles are moved through pores of the porous layer in response to an electric field (for example, see Japanese Unexamined Patent Application Publication Nos. 2005-107146, 2005-128143, and 2002-244163, and also Japanese Examined Patent Publication No. S50-015120. In this type of method, a polymeric film in which pores are formed by perforation processing using a laser, a cloth woven of synthetic fiber, a continuous-bubble porous polymer, or the like is used for the porous layer.

SUMMARY

Although various display methods have been proposed for the electrophoretic display, the display quality thereof is still insufficient. Considering colorization and development to moving-image display in future, further improvement in contrast is expected.

It is desirable to provide an electrophoresis device and a display unit which are capable of realizing high contrast.

According to an embodiment of the technology, there is provided a first electrophoresis device including a plurality of electrophoretic particles and a porous layer that are contained in an insulating liquid, the porous layer being formed using a fibrous structure including a plurality of non-migrating particles. An average particle size of the electrophoretic particles is equal to or less than one-fifth of an average pore size of the porous layer.

According to an embodiment of the technology, there is provided a second electrophoresis device including a plurality of electrophoretic particles and a porous layer that are contained in an insulating liquid, the porous layer being formed using a fibrous structure including a plurality of non-migrating particles. A value of D90 in a cumulative particle-size distribution of the electrophoretic particles is equal to or less than a half of an average pore size of the porous layer.

According to an embodiment of the technology, there is provided a first display unit provided with an electrophoretic device between a pair of substrates each having an electrode, one or both of the substrates being optically transparent. The electrophoretic device includes a plurality of electrophoretic particles and a porous layer that are contained in an insulating liquid, the porous layer being formed using a fibrous structure including a plurality of non-migrating particles. An average particle size of the electrophoretic particles is equal to or less than one-fifth of an average pore size of the porous layer.

According to an embodiment of the technology, there is provided a second display unit provided with an electrophoretic device between a pair of substrates each having an electrode, one or both of the substrates being optically transparent. The electrophoretic device includes a plurality of electrophoretic particles and a porous layer that are contained in an insulating liquid, the porous layer being formed using a fibrous structure including a plurality of non-migrating particles. A value of D90 in a cumulative particle-size distribution of the electrophoretic particles is equal to or less than a half of an average pore size of the porous layer.

In the first electrophoresis device and the first display unit according to the above-described embodiments of the technology, the average particle size of the electrophoretic particles is equal to or less than one-fifth of the average pore size of the porous layer. Therefore, movements of the electrophoretic particles are less prone to being disturbed by the porous layer and thus, a white reflectance or a black reflectance improves.

In the second electrophoresis device and the second display unit according to the above-described embodiments of the technology, the value of D90 in the cumulative particle-size distribution of the electrophoretic particles is equal to or less than a half of the average pore size of the porous layer. Therefore, movements of the electrophoretic particles are less prone to being disturbed by the porous layer and thus, a white reflectance or a black reflectance improves.

According to the first electrophoresis device and the first display unit in the above-described embodiments of the technology, the average particle size of the electrophoretic particles is equal to or less than one-fifth of the average pore size of the porous layer. Thus, moving paths of the electrophoretic particles are secured, which makes it possible to improve the white reflectance or the black reflectance. Therefore, high contrast is achievable.

According to the second electrophoresis device and the second display unit in the above-described embodiments of the technology, the value of D90 in the cumulative particle-size distribution of the electrophoretic particles is equal to or less than a half of the average pore size of the porous layer. Thus, moving paths of the electrophoretic particles are secured, which makes it possible to improve the white reflectance or the black reflectance. Therefore, high contrast is achievable.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to describe the principles of the technology.

DETAILED DESCRIPTION

An embodiment of the technology will be described in detail with reference to the drawings. It is to be noted that the description will be provided in the following order.
1. Embodiment
1-1. Overall Configuration
1-2. Method of Forming Porous Layer
2. Application Example
3. Experimental Examples
(1. Embodiment: Electrophoresis Device)

Figure 1:
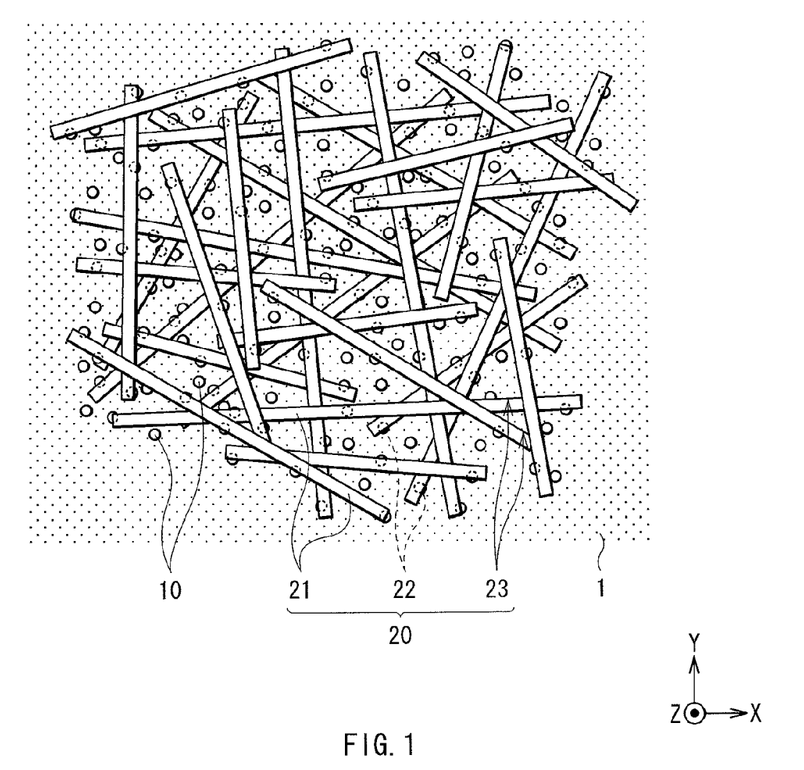
FIG. 1 is a plan view illustrating a configuration of an electrophoresis device according to an embodiment of the technology.
Figure 2:
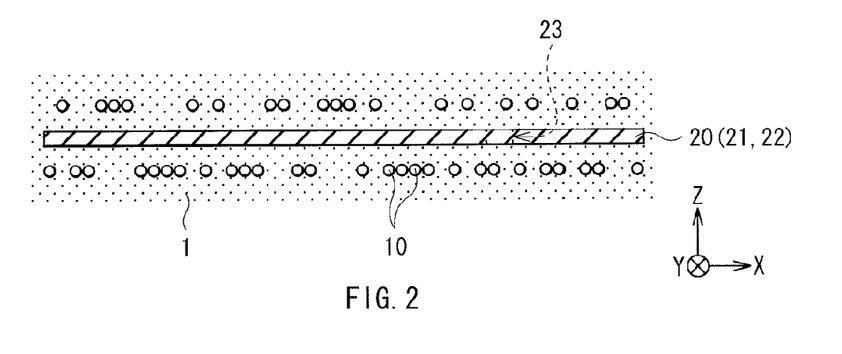
FIG. 2 is a cross-sectional diagram illustrating a configuration of the electrophoresis device.

FIG. 1 and FIG. 2 illustrate a plane configuration and a cross-sectional configuration, respectively, of an electrophoresis device according to an embodiment of the technology. The electrophoresis device produces contrast by using an electrophoretic phenomenon, and may be applied to various kinds of electronic apparatuses such as display units, for example. The electrophoresis device includes a plurality of electrophoretic particles 10 having polarity and a porous layer 20 which are contained in an insulating liquid 1. In the present embodiment, the porous layer 20 includes a fibrous structure 21 and non-migrating particles 22. The non-migrating particles 22 are dispersed in a predetermined range in the fibrous structure 21.

(1-1. Overall Configuration)
[Insulating Liquid]

The insulating liquid 1 may be, for example, any one or two or more kinds of organic solvents, specifically, paraffin, isoparaffin, and the like. A viscosity and a refractive index of the insulating liquid 1 is preferably as low as possible. The reason is that mobility (a response speed) of the electrophoretic particles 10 improves and energy (consumed power) necessary for movement of the electrophoretic particles 10 decreases accordingly. In addition, a reflectance of the porous layer 20 rises due to an increase in difference between a refractive index of the insulating liquid 1 and a refractive index of the porous layer 20.

It is to be noted that the insulating liquid 1 may contain various kinds of materials as necessary. Examples of such materials may include a coloring agent, a charge control agent, a dispersion stabilizer, a viscosity modifier, a surfactant, and a resin.

[Electrophoretic Particles]

The electrophoretic particles 10 are charged particles dispersed in the insulating liquid 1, and movable through the porous layer 20 in response to an electric field. For example, the electrophoretic particles 10 may be of any one kind or two or more kinds of particles (powder) such as an organic pigment, an inorganic pigment, a dye, a carbon material, a metallic material, a metal oxide, glass, and a polymer material (a resin). In addition, the electrophoretic particles 10 may be crushed particles or capsule particles of a resin solid content containing the above-described particles. It is to be noted that materials equivalent to the above-listed carbon material, metallic material, metal oxide, glass, and polymer material are excluded from materials equivalent to the above-mentioned organic pigment, inorganic pigment, and dye.

Examples of the organic pigment may include azo pigments, metal complex azo pigments, polycondensation azo pigments, flavanthrone pigments, benzimidazolone pigments, phthalocyanine pigments, quinacridone pigments, anthraquinone pigments, perylene pigments, perinone pigments, anthrapyridine pigments, pyranthrone pigments, dioxazine pigments, thioindigo pigments, isoindolinone pigments, quinophthalone pigments, and indanthrene pigments. Examples of the inorganic pigment may include zinc oxide (e.g. zinc flower and zinc white), antimony white, carbon black, black iron oxide, titanium boride, red oxide, mapico yellow, minium, cadmium yellow, zinc sulphide, lithopone, barium monosulfide, cadmium selenide, calcium carbonate, barium sulfate, lead chromate, lead sulfate, barium carbonate, white lead, and alumina white. Examples of the dye may include nigrosine dyes, azo dyes, phthalocyanine dyes, quinophthalone dyes, anthraquinone dyes, and methine dyes. Examples of the carbon material may include carbon black. Examples of the metallic material may include gold, silver, and copper. Examples of the metal oxide may include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material may include a high molecular compound into which a functional group having an optical absorption range in a visible light region is introduced. The kind of the polymer material is not limited in particular, as long as such a high molecular compound having the optical absorption range in the visible light region is adopted.

The content (density) of the electrophoretic particles 10 in the insulating liquid 1 may be, for example, about 0.1 wt % to about 10 wt %, although it is not limited in particular. This is because a shielding property and mobility of the electrophoretic particles 10 are secured. In this case, shielding (hiding) of the porous layer 20 by the electrophoretic particles 10 may be difficult when the content is below 0.1 wt %. On the other hand, when the content is above 10 wt %, dispersibility of the electrophoretic particles 10 may decrease, making movements of the electrophoretic particles 10 less easy to occur, thereby leading to a possibility of occurrence of agglomeration in some cases.

The electrophoretic particles 10 have an optical reflecting property (reflectance) which is freely set. Although the optical reflecting property of the electrophoretic particles 10 is not limited in particular, this property is preferably set so that the electrophoretic particles 10 is allowed to shield the porous layer 20 at least. This is to produce the contrast by using a difference between the optical reflecting property of the electrophoretic particles 10 and an optical reflecting property of the porous layer 20.

Here, a specific material used to form the electrophoretic particles 10 is selected depending on a role that the electrophoretic particles 10 plays to produce the contrast. Specifically, as the material used when the electrophoretic particles 10 perform bright display, metal oxide or organic spherical particles, for example, may be used. Examples of the metal oxide may include titanium oxide, zinc oxide, zirconium oxide, barium titanate, barium sulfate, and potassium titanate, and examples of the organic spherical particles may include melamine and benzoguanamine. On the other hand, when the electrophoretic particles 10 perform dark display, a carbon material, a metal oxide, or the like may be used. Examples of the carbon material may include carbon black, and examples of the metal oxide may include copper-chromium oxide, copper-manganese oxide, copper-iron-manganese oxide, copper-chromium-manganese oxide, and copper-iron-chromium oxide. Above all, the carbon material may be preferable, because superior chemical stability, mobility, and light absorption are achieved.

When the electrophoretic particles 10 perform the bright display, the color of the electrophoretic particles 10 at the time when the electrophoretic particles are visually recognized from outside may be preferably a color close to white, and more preferably white, although this color is not limited in particular as long as the contrast is produced. On the other hand, when the electrophoretic particles 10 perform the dark display, the color of the electrophoretic particles 10 at the time when the electrophoretic particles are visually recognized from outside may be preferably a color close to black, and more preferably black, although this color is not limited in particular as long as the contrast is produced. The reason is that the contrast increases in either case.

It is to be noted that, preferably, the electrophoretic particles 10 is readily dispersed and charged in the insulating liquid 1 for a long time, while being less easily adsorbed on the porous layer 20. Therefore, a dispersant (or an electric charge modifier) used to disperse the electrophoretic particles 10 by electrostatic repulsion may be used, or a surface treatment may be applied to the electrophoretic particles 10, or both may be used together.

Examples of the dispersant may include the Solsperse series made by The Lubrizol Corporation, the BYK series as well as the Anti-Terra series made by BYK-Chemie GmbH, and the Span series made by ICI Americas Inc.

Examples of the surface treatment may include a rosin treatment, a surfactant treatment, a pigment derivative treatment, a coupling agent treatment, a graft polymerization treatment, and a microencapsulation treatment. Above all, the graft polymerization treatment, the microencapsulation treatment, and a combination of these treatments may be preferable. The reason is that long-term dispersion stability and the like are achieved.

Used for the surface treatment may be, for example, a material that includes a functional group capable of being adsorbed on the surface of the electrophoretic particles 10 and a polymeric functional group (namely, an adsorptive material). The kind of the functional group capable of being adsorbed is determined depending on the material of the electrophoretic particles 10. Examples of the functional group may include an aniline derivative such as 4-vinyl aniline for the carbon material such as carbon black, and an organosilane derivative such as methacrylate-3-(trimethoxysilyl)propyl for the metal oxide. Examples of the polymeric functional group may include a vinyl group, an acrylic group, and a methacryl group.

Further, examples of the material used for the surface treatment may include a material capable of being grafted onto the surface of the electrophoretic particles 10 into which a polymeric functional group is introduced (namely, a graft material). This graft material preferably has a polymeric functional group and a functional group for dispersion. The functional group for dispersion is capable of being dispersed in the insulating liquid 1 and maintaining dispersibility by steric hindrance. The kind of the polymeric functional group is similar to that described above for the adsorptive material. The functional group for dispersion may be, for example, a branched-alkyl group when the insulating liquid 1 is paraffin. In order to cause graft and polymerization of the graft material, a polymerization initiator such as azobisisobutyronitrile (AIBN), for example, may be used.

For reference, details on a way of dispersing the electrophoretic particles 10 in the insulating liquid 1 as described above are described in books such as "Dispersion technology of ultrafine particles and evaluation thereof: surface treatment and fine grinding, as well as dispersion stability in air/liquid/polymer (Science & Technology Co., Ltd.)".

(Particle Size of Electrophoretic Particles 10)

Figure 3A:
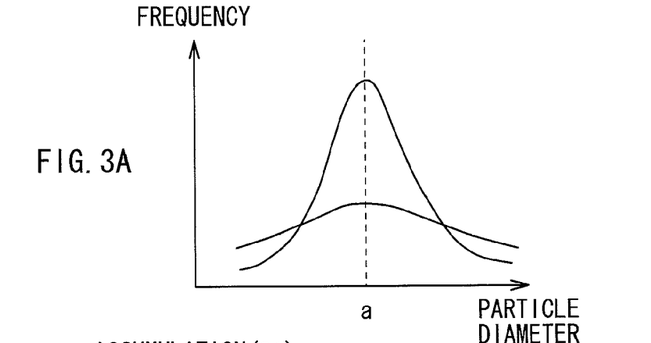
FIGS. 3A and 3B are schematic diagrams each illustrating an example of a cumulative particle-size distribution.
Figure 3B:
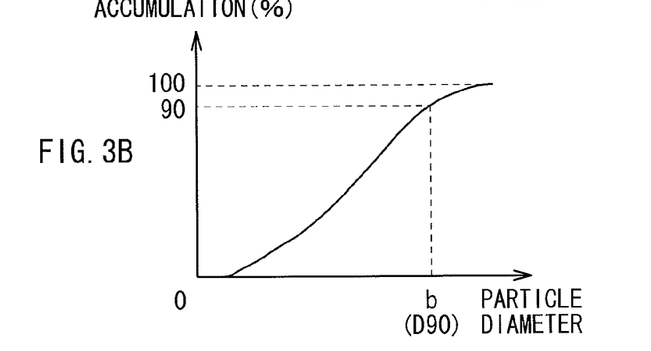

In the present embodiment, a particle size (a particle diameter) of the electrophoretic particles 10 is set according to an average pore size of the porous layer 20 described later (specifically, pores 23 in the fibrous structure 21, which will be described later). To be more specific, an average particle size ("a" in FIG. 3A) of the electrophoretic particles 10 is equal to or less than one-fifth, or is desirably equal to or less than one-tenth, of the average pore size of the porous layer 20. Alternatively, a value of D90 ("b" in FIG. 3B) in a cumulative particle-size distribution of the electrophoretic particles 10 is equal to or less than a half, or is desirably equal to or less a quarter, of the average pore size of the porous layer 20. More desirably, the average particle size of the electrophoretic particles 10 may be equal to or less than one-fifth (desirably, equal to or less than one-tenth) of the average pore size of the porous layer 20, and at the same time, the value of D90 in the cumulative particle-size distribution may be equal to or less than a half (which may be desirably equal to or less than a quarter) of the average pore size of the porous layer 20.

Desirably, a specific numerical range of the average particle size may be, for example, about 30 nm to about 300 nm both inclusive. This is because contrast decreases due to poor colorability of the particles when the average particle size is less than 30 nm, and on the other hand, reliability declines due to unstable dispersibility in the insulating liquid 1 when the average particle size is over 300 nm. More desirably, the specific numerical range of the average particle size may be, for example, about 50 nm to about 200 nm both inclusive. Meanwhile, a specific numerical range of D90 in the cumulative particle-size distribution is desirably, for example, about 150 nm to about 600 nm both inclusive.

The above-described particle size of the electrophoretic particles 10 may be measured and analyzed by the following technique, for example. That is, a solution, which may be adjusted by diluting the insulating liquid 1 containing the electrophoretic particles 10 to about one-hundredth through use of, for example, isoparaffin (IsoparG made by Exxon Mobil Corporation), is measured using ELSZ-1 (made by Otsuka Electronics Co., Ltd.). Next, a scattering intensity distribution is determined by, for example, a particle size analysis using the Marquardt method, and the values of the average particle size (a) and D90 (b) are allowed to be calculated based on this scattering intensity distribution.

[Porous Layer]

The porous layer 20 is a three-dimensional structure formed using the fibrous structure 21, and has a plurality of pores 23 formed by the three-dimensional structure. A plurality of non-migrating particles 22 are included in the fibrous structure 21, in other words, the plurality of non-migrating particles 22 are held by the fibrous structure 21. In the porous layer 20 which is the three-dimensional structure, a plurality of fibrous structures 21 may be intertwined with each other at random, or gathered and stacked at random, or both ways may be mixed. In a case where the plurality of fibrous structures 21 are present, the fibrous structures 21 each hold one of or two or more of the non-migrating particles 22. It is to be noted that FIG. 2 illustrates the case where the porous layer 20 is formed using the plurality of fibrous structures 21.

The porous layer 20 is the three-dimensional structure formed using the fibrous structures 21, so as use diffused reflection (multiple scattering) of light (external light). Such a configuration makes it easy to realize excellent contrast, while achieving a reduction in thickness of the electrophoresis device. In addition, energy necessary for movement of the electrophoretic particles 10 is reduced and thus, low power consumption is achieved.

Each of the fibrous structures 21 is a fibrous substance having a sufficiently large length with respect to a fiber diameter (a diameter). The fibrous structure 21 may be made of, for example, one kind or two or more kinds of polymer materials, inorganic materials, or the like, or may be made of other type of material. Examples of the polymer materials may include nylon, polylactic acid, polyamide, polyimide, polyethylene terephthalate, polyacrylonitrile, polyoxyethylene, polyvinylcarbazole, polyvinyl chloride, polyurethane, polystyrene, polyvinyl alcohol, polysulfone, polyvinylpyrrolidone, polyvinylidene fluoride, polyhexafluoropropylene, cellulose acetate, collagen, gelatin, chitosan, and copolymers of these materials. Examples of the inorganic materials may include titanium oxide. Above all, the polymer materials are preferable as the material of the fibrous structures 21. This is because the polymer materials are low in reactivity (photoreactivity), in other words, these materials are chemically stable, which suppresses an unintended decomposition reaction of the fibrous structures 21. It is to be noted that when the fibrous structures 21 are formed of a material with high reactivity, the surface of the fibrous structures 21 is preferably coated by a freely selected protective layer (not illustrated).

The fibrous structures 21 is not limited in particular in terms of shape (appearance), as long as a slim shape having a sufficiently large length with respect to the fiber diameter as mentioned above is adopted. Specifically, the fibrous structures 21 may be linear, frizzed, or bent at some point. Although a method of forming the fibrous structures 21 is not limited in particular, preferably, for example, a phase separation method, a phase inversion method, an electrostatic (electric field) spinning method, a melt spinning method, a wet type spinning method, a dry type spinning method, a gel spinning method, a sol-gel method, a spray coating method, or the like is used as the method. The reason is that it is easy to form the fibrous substance having a sufficiently long length with respect to the fiber diameter, in a simple and stable manner.

The fiber diameter of the fibrous structure 21 is not limited in particular, but is preferably as small as possible. The reason is that the light is easily diffused and the diameter of the pores 23 is increased. However, it is necessary to determine the fiber diameter so that the fibrous structures 21 are allowed to hold the non-migrating particles 22 described later. For this reason, the fiber diameter of the fibrous structures 21 is preferably about 50 nm or more and about 2,000 nm or less. Also, a mean fiber diameter thereof is preferably about 10 μm or less. It is to be noted that a lower limit of the mean fiber diameter is not limited in particular, but is, for example, about 0.1 μm and may be less than 0.1 μm. The fiber diameter and the mean fiber diameter may be measured by, for example, microscopy using a scanning electron microscope. It is to be noted that an average length of the fibrous structures 21 may be freely selected.

In particular, the fibrous structures 21 are preferably made of nanofibers. The reason is that the reflectance of the porous layer 20 is further increased by easier diffusion of light, and also, movements of the electrophoretic particles 10 through the pores 23 are facilitated due to an increase in the ratio of the pores 23 to unit volume. This increases the contrast, and reduces the energy necessary for movement of the electrophoretic particles 10. The nanofiber is a fibrous substance having a fiber diameter of about 0.001 μm to about 0.1 μm both inclusive and a length which is a hundred times longer than the fiber diameter. The fibrous structures 21 are preferably made of nanofibers formed by the electrostatic spinning method. The reason is that it is easy to form the fibrous structures 21 each having a small fiber diameter, in a simple and stable manner.

The fibrous structures 21 preferably has an optical reflecting property different from that of the electrophoretic particles 10. Specifically, although the optical reflecting property of the fibrous structures 21 is not limited in particular, at least the entire porous layer 20 is preferably allowed to shield the electrophoretic particles 10. This is to produce the contrast by using the difference between the optical reflecting property of the electrophoretic particles 10 and the optical reflecting property of the porous layer 20 as described above. Therefore, the fibrous structures 21 that are optically transparent (colorless and transparent) in the insulating liquid 1 is less preferable. However, the optical reflecting property of the fibrous structures 21 may be freely selected, in a case where the optical reflecting property of the fibrous structures 21 hardly affects the optical reflecting property of the porous layer 20, and the optical reflecting property of the porous layer 20 is substantially determined by an optical reflecting property of the non-migrating particles 22.

(Average Pore Size of Porous Layer 20)

The average pore size (c) of the pores 23 is not limited in particular, but is desirably about 0.15 μm to about 3 μm both inclusive. A lower limit in this numerical range is a value corresponding to the above-mentioned lower limit (30 nm) of the electrophoretic particles 10. On the other hand, when the average pore size of the pores 23 exceeds an upper limit (3 μm), a desired reflectance is not achieved. This average pore size is more desirably, for example, about 0.3 μm to about 2.0 μm both inclusive. In the present embodiment, as described above, the average pore size (c) of the pores 23 is set to meet a condition that the average particle size (a) of the electrophoretic particles 10 is equal to or less than one-fifth of the average pore size (c) of the porous layer 20, or a condition that the value of D90 (b) in the cumulative particle-size distribution is equal to or less than a half of the average pore size (c) of the porous layer 20, or both of these conditions.

The above-described average pore size of such the pores 23 may be measurable by the following technique, for example. For instance, the porous layer 20 may be measurable by a bubble point method (ASTMF316-86, JIS K3832) using Perm-Porometer (made by Seika Corporation), after being cut into a predetermined size and then dipped into a Galwick solution.

The thickness of the porous layer 20 is not limited in particular, but may be, for example, about 5 μm to about 100 μm both inclusive. This is to increase a shielding property of the porous layer 20, and cause the electrophoretic particles 10 to move easily through the pores 23.

The non-migrating particles 22 are particles which are held (fixed) by the fibrous structures 21 and not electrophoresed. Since the fibrous structures 21 contain the plurality of non-migrating particles 22, the light is more easily diffused and the contrast of the electrophoresis device is further increased.

The non-migrating particles 22 in the fibrous structures 21 is preferably dispersed in a predetermined range. It is to be noted that the non-migrating particles 22 may be partially exposed from the fibrous structures 21, or may be buried in the fibrous structures 21, as long as the non-migrating particles 22 are held by the fibrous structures 21.

The non-migrating particles 22 have the optical reflecting property different from that of the electrophoretic particles 10. The optical reflecting property of the non-migrating particles 22 is not limited in particular, but at least the entire porous layer 20 is preferably allowed to shield the electrophoretic particles 10. This is to produce the contrast by using the difference between the optical reflecting property of the electrophoretic particles 10 and the optical reflecting property of the porous layer 20 as described above. It is to be noted that, here, an optical reflectance of the non-migrating particles 22 is higher than an optical reflectance of the electrophoretic particles 10.

Here, a material used to form the non-migrating particles 22 is selected depending on a role that the non-migrating particles 22 plays to produce the contrast. Specifically, the material used when the non-migrating particles 22 perform bright display is similar to the material selected when the electrophoretic particles 10 perform the bright display. On the other hand, the material used when the non-migrating particles 22 perform dark display is similar to the material selected when the electrophoretic particles 10 perform the dark display. Above all, a metal oxide may be preferable as the material selected when the non-migrating particles 22 perform the bright display. This is because superior chemical stability, fixity, and light reflectivity are achieved. The material used to form the non-migrating particles 22 may be the kind same as or different from that of the material used to form the electrophoretic particles 10, as long as the contrast is allowed to be produced. It is to be noted that a color visually recognized when the non-migrating particles 22 perform the bright display or the dark display is similar to the visually-recognized color of the electrophoretic particles 10.

(1-2. Method Of Forming Porous Layer)

An example of a procedure of forming the porous layer 20 is as follows. First, an optimum range of an added amount of the non-migrating particles 22 to be dispersed in the fibrous structures 21 is determined. Specifically, there is prepared a polymer solution in which a polymer material (e.g. polyacrylonitrile) serving as the material of the fibrous structures 21 (a main material) is dissolved in an organic solvent (e.g. N,N'-dimethylformamide (DMF)). This polymer solution is divided into a plurality of polymer solutions, and the non-migrating particles 22 are dispersed in each of these polymer solutions. In this process, the non-migrating particles 22 are dispersed so that these dispersion solutions (i.e. the polymer solutions) have the respective densities gradually differentiated by about 5 wt %, and each of the dispersion solutions is stirred sufficiently. Next, the fibrous structures 21 are formed by performing spinning in each of the dispersion solutions through use of an electrostatic spinning method. Subsequently, the optical reflectance of the fibrous structures 21 in each of the densities is measured to determine the optimum range of the added amount of the non-migrating particles 22. Next, a polymer solution is prepared in a manner similar to that described above, and the non-migrating particles 22 in the optimum range determined in the above-described steps are added to the prepared polymer solution, so that a dispersion solution is prepared. Subsequently, spinning is performed using the prepared dispersion solution through the electrostatic spinning method, so that the fibrous structures 21 are formed. The porous layer 20, in which light scattering efficiency is improved while moving paths of the electrophoretic particles 10 (i.e. the pores 23) are secured, is thus obtained.

It is to be noted that the particle size of the electrophoretic particles is set according to the average pore size of this porous layer 20. As a technique of controlling the particle size of the electrophoretic particles, there may be used, for example, a centrifugal separation method, a method of removing coarse particles using a filter, a technique using a surface treatment, a technique of adjusting the size of a core particle, and a dispersion method.

[Preferable Display Method of Electrophoresis Device]

In the electrophoresis device, as described above, the electrophoretic particles 10 and the porous layer 20 (the fibrous structures 21 including the non-migrating particles 22) each perform the bright display or the dark display, thereby producing the contrast. In this case, the electrophoretic particles 10 may perform the bright display, while the porous layer 20 may perform the dark display, and vice versa. Such a difference in role is determined by a relationship between the optical reflecting property of the electrophoretic particles 10 and the optical reflecting property of the porous layer 20. In other words, the reflectance of the one performing the bright display is higher than the reflectance of the other performing the dark display.

Above all, preferably, the electrophoretic particles 10 perform the dark display, while the porous layer 20 performs the bright display. When the optical quality of the porous layer 20 is determined substantially based on the optical reflecting property of the non-migrating particles 22, the reflectance of the non-migrating particles 22 is preferably higher than the reflectance of the electrophoretic particles 10. The reason for this is that the reflectance of the bright display in this case greatly increases using diffused reflection of the light caused by the porous layer 20 (the three-dimensional structure), and therefore, the contrast also greatly increases accordingly.

[Operation of Electrophoresis Device]

In the electrophoresis device, the optical reflecting property of the electrophoretic particles 10 and the optical reflecting property of the porous layer 20 (the non-migrating particles 22) are different from each other. In this case, when an electric field is applied to the electrophoresis device, the electrophoretic particles 10 move through the porous layer 20 (the pores 23) in a range to which the electric field is applied. Thus, when the electrophoresis device is viewed from the side where the electrophoretic particles 10 have moved, the dark display (or the bright display) is performed by the electrophoretic particles 10 in a range where the electrophoretic particles 10 have moved, while the bright display (or the dark display) is performed by the porous layer 20 in a range where the electrophoretic particles 10 have not moved. This produces the contrast.

As mentioned earlier, methods of improving display quality, in particular, contrast and response speed, of electrophoretic displays have been searched for. As one of such methods, there may be, for example, a method of improving contrast by adding non-migrating particles, which have an optical reflecting property different from that of electrophoretic particles performing dark display (or bright display), to fibrous structures of a porous layer performing bright display (or dark display), in a manner similar to the present embodiment. This improves the contrast and increases the response speed of the electrophoretic particles to levels higher than those of an ordinary electrophoresis device.

[Function and Effects]

In the present embodiment, the average particle size of the electrophoretic particles 10 is equal to or less than one-fifth of the average pore size of the porous layer 20, or D90 in the cumulative particle-size distribution is equal to or less than a half of the average pore size of the porous layer 20. Therefore, movements of the electrophoretic particles 10 are less prone to being disturbed by the porous layer 20 and thus, a white reflectance or a black reflectance improves.

In the present embodiment, as described above, the average particle size of the electrophoretic particles 10 is equal to or less than one-fifth of the average pore size of the porous layer 20, or D90 in the cumulative particle-size distribution is equal to or less than a half of the average pore size of the porous layer 20, which makes it possible to improve the white reflectance or the black reflectance. Therefore, high contrast is achievable.

In addition, since the movements of the electrophoretic particles 10 are less prone to being disturbed by the porous layer 20, the response speed improves. This makes it possible to improve display quality and reduce consumed power, in electronic apparatuses such as a display unit in which the above-described electrophoresis device is used for a pixel, for example.

(2. Application Example Of Electrophoresis Device)

Now, an application example of the above-described electrophoresis device will be described. The electrophoresis device is applicable to various types of electronic apparatuses, which are not limited in particular. For instance, the electrophoresis device may be applied to a display unit.

[Overall Configuration of Display Unit]

Figure 4:
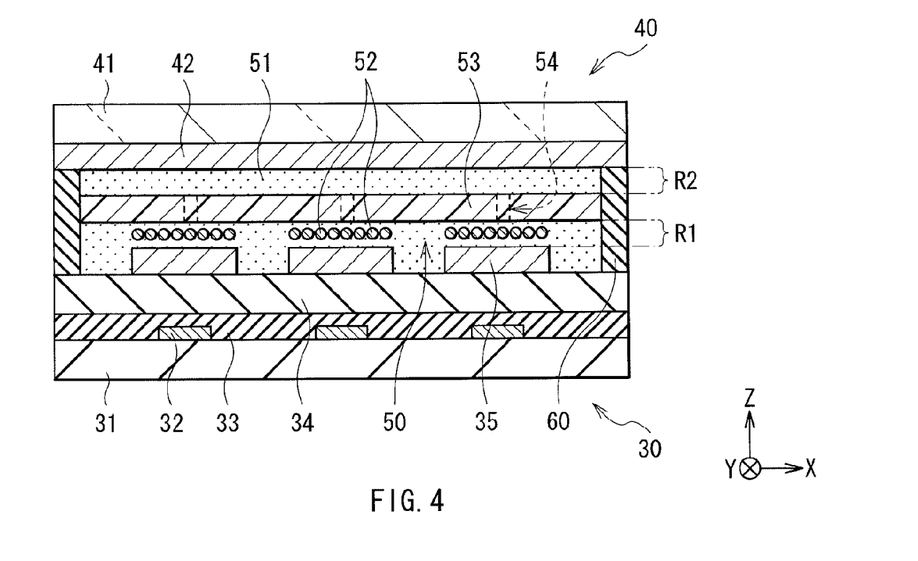
FIG. 4 is a cross-sectional diagram illustrating a configuration of a display unit using the electrophoresis device according to the embodiment of the technology.
Figure 5:
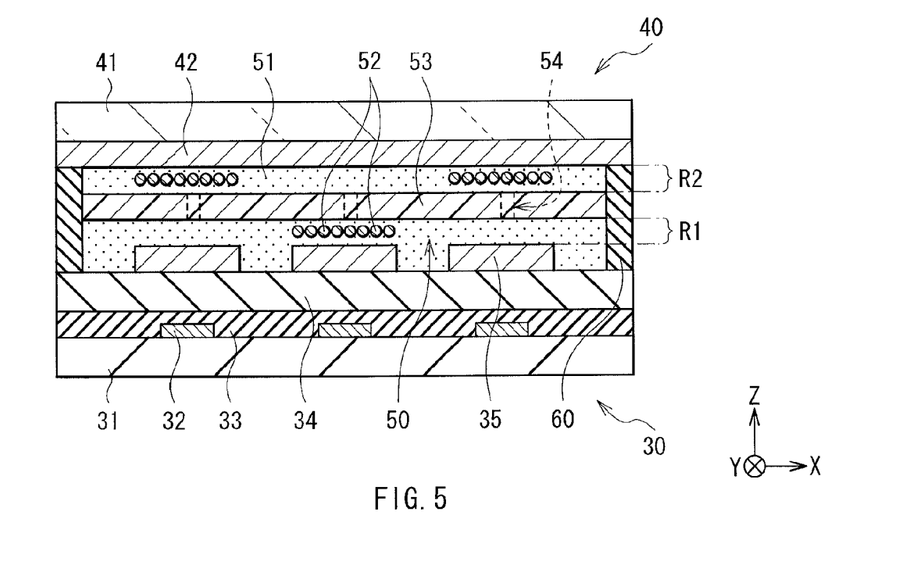
FIG. 5 is a cross-sectional diagram used to describe operation of the display unit.

FIG. 4 illustrates a cross-sectional configuration of a display unit, and FIG. 5 is provided to describe operation of the display unit illustrated in FIG. 4. It is to be noted that the configuration of the display unit which will be described below is only an example and modifiable as appropriate.

This display unit is an electrophoretic display that displays an image (e.g. character information and the like) by using an electrophoretic phenomenon (i.e. a so-called electronic paper display). In this display unit, for instance, as illustrated in FIG. 4, a drive substrate 30 and a counter substrate 40 is disposed to face each other with an electrophoresis device 50 interposed therebetween, and an image is displayed on the counter substrate 40 side, for example. It is to be noted that the drive substrate 30 and the counter substrate 40 are spaced apart by a spacer 60 so that a predetermined space is formed.

[Drive Substrate]

In the drive substrate 30, for example, a plurality of thin-film transistors (TFTs) 32, a protective layer 33, a planarizing insulating layer 34, and a plurality of pixel electrodes 35 are formed in this order on one side of a support base 31. The TFTs 32 and the pixel electrodes 35 are arranged in a matrix or segmented, corresponding to a pixel arrangement.

The support base 31 may be formed of, for example, a material such as an inorganic material, a metallic material, and a plastic material. Examples of the inorganic material may include silicon (Si), silicon oxide ($SiO_x$), silicon nitride ($SiN_x$), and aluminum oxide ($AlO_x$). Examples of the silicon oxide may include glass and spin-on-glass (SOG). Examples of the metallic material may include aluminum (Al), nickel (Ni), and stainless steel. Examples of the plastic material may include polycarbonate (PC), polyethylene terephthalate (PET), polyethylene naphthalate (PEN), and polyethyl ether ketone (PEEK).

The support base 31 may be optically transparent, or may be optically non-transparent. Since an image is displayed on the counter substrate 40 side, it is not necessary that the support base 31 be optically transparent. Further, the support base 31 may be a rigid substrate such as a wafer, or may be a thin-layer glass or a film with flexibility. However, the latter is preferable because a flexible (foldable) display unit is allowed to be realized.

The TFT 32 is a switching device used to select a pixel. It is to be noted that the TFT 32 may be an inorganic TFT using an inorganic semiconductor layer as a channel layer, or may be an organic TFT using an organic semiconductor layer as a channel layer. The protective layer 33 and the planarizing insulating layer 34 may be each formed of, for example, an insulating resin material such as polyimide. However, the planarizing insulating layer 34 may be omitted when the surface of the protective layer 33 is sufficiently flat. The pixel electrode 35 may be formed of, for example, a metallic material such as gold (Au), silver (Ag), and copper (Cu). This pixel electrode 35 is connected to the TFT 32 through a contact hole (not illustrated) provided in the protective layer 33 and the planarizing insulating layer 34.

[Counter Substrate]

In the counter substrate 40, a counter electrode 42 is formed over the entire one surface of a support base 41, for example. However, the counter electrode 42 may be provided as electrodes arranged in a matrix or segmented, in a manner similar to the pixel electrodes 35.

The support base 41 is formed of a material which is optically transparent otherwise similar to that of the support base 31. Since an image is displayed on the counter substrate 40 side, it is necessary that the support base 41 be optically transparent. For example, the counter electrode 42 may be formed of a translucent conductive material (a transparent electrode material) such as Indium Tin Oxide (ITO), Antimony Tin Oxide (ATO), Fluorine doped Tin Oxide (FTO), and Aluminum doped Zinc Oxide (AZO).

In a case in which an image is displayed on the counter substrate 40 side, the electrophoresis device 50 is viewed through the counter electrode 42. Therefore, the optical transparency (transmittance) of the counter electrode 42 is preferably as high as possible, which is, for example, about 80% or more. In addition, the electrical resistance of the counter electrode 42 is preferably as low as possible, and may be, for example, about 100 $\Omega$/sq or less.

[Electrophoresis Device]

The electrophoresis device 50 has a configuration similar to that of the electrophoresis device described above. Specifically, the electrophoresis device 50 includes a plurality of electrophoretic particles 52 and a porous layer 53 which are contained in an insulating liquid 51. The porous layer 53 has a plurality of pores 54. The insulating liquid 51 fills a space between the drive substrate 30 and the counter substrate 40, and the porous layer 53 may be supported by the spacer 60, for example. The space filled with the insulating liquid 51 is divided into a shunting region R1 and a moving region R2, with the porous layer 53 serving as a border therebetween. The shunting region R1 is on the side closer to the pixel electrodes 35, and the moving region R2 is on the side closer to the counter electrode 42. Configurations of the insulating liquid 51, the electrophoretic particles 52, and the porous layer 53 are similar to those of the insulating liquid 1, the electrophoretic particles 10, and the porous layer 20, respectively. It is to be noted that FIG. 4 and FIG. 5 each illustrate only part of the pores 54 for the purpose of simplifying the contents of illustration.

[Spacer]

The spacer 60 is formed of, for example, an insulating material such as a polymer material.

The spacer 60 is not limited in particular in terms of shape. However, the spacer 60 is preferably shaped to distribute the electrophoretic particles 52 uniformly without disturbing the movements of the electrophoretic particles 52, and may be, for example, shaped like a grid. The spacer 60 is also not limited in particular in terms of thickness. However, the spacer 60 is preferably as thin as possible to lower consumed power, and may have a thickness of, for example, about 10 μm to about 100 μm both inclusive.

[Operation of Display Device]

In this display unit, as illustrated in FIG. 4, the plurality of electrophoretic particles 52 are located in the shunting region R1 in an initial state. In this state, the electrophoretic particles 52 are covered by the porous layer 53 in all pixels and thus, contrast is not produced (an image is not displayed) when the electrophoresis device 50 is viewed from the counter substrate 40 side.

When a pixel is selected by the TFT 32 and an electric field is applied between the pixel electrode 35 and the counter electrode 42, the electrophoretic particles 52 move from the shunting region R1 to the moving region R2 through the porous layer 53 (the pores 54) as illustrated in FIG. 5. In this state, a pixel in which the electrophoretic particles 52 are covered by the porous layer 53 and a pixel in which the electrophoretic particles 52 are not covered by the porous layer 53 are both present. Therefore, contrast is produced when the electrophoresis device 50 is viewed from the counter substrate 40 side. Thus, an image is displayed.

[Function and Effects of Display Unit]

According to this display unit, since the electrophoresis device 50 has a configuration similar to that of the electrophoresis device described above, high contrast, fast response, and low power consumption are realized. Therefore, a high-quality image is allowed to be displayed with low power.

(3. Experimental Examples)

Now, experimental examples of the technology will be described in detail.

Experimental Example 1-1

A display unit was produced using black (for dark display) electrophoretic particles and a white (for bright display) porous layer (i.e. a particle-containing fiber-shaped structure), by the following procedure.

[Preparation of Migrating Particles]

First, a solution A was obtained by dissolving 43 g of sodium hydroxide and 0.37 g of sodium silicate in 43 g of water. Subsequently, 5 g of complex oxide fine particles (DAIPYROXIDE Color TM9550 made by Dainichiseika Color & Chemicals Mfg. Co., Ltd.) was added while the solution A was stirred, and then, the solution A was stirred (for fifteen minutes). Next, the solution A was subjected to supersonic wave stirring (at about 30° C. to about 35° C., for fifteen minutes). The solution A was then heated (90° C.), followed by dropping, for two hours, of 15 cm$^3$ (=ml) of 0.22 mol/cm$^3$ sulfuric acid and 7.5 cm$^3$ of water solution in which 6.5 mg of sodium silicate and 1.3 mg of sodium hydroxide were dissolved. Subsequently, the solution A was cooled (to room temperature), and then 1.8 cm$^3$ of 1 mol/cm$^3$ sulfuric acid was added, which was followed by centrifugal separation (at 3700 rpm, for thirty minutes) and decantation. Next, redispersion in ethanol was performed which was followed by centrifugal separation (at 3500 rpm, for thirty minutes) and decantation, and this process was repeated twice. Subsequently, a mixture of 5 cm$^3$ of ethanol and 0.5 cm$^3$ of water were added to each bottle, and then, supersonic wave stirring was performed (for one hour), so that a dispersion solution of silane-coated complex oxide particles was obtained.

Next, 3 cm$^3$ of water, 30 cm$^3$ of ethanol, and 4 g of N-[3-(trimethoxysilyl)propyl]-N'-(4-vinylbenzyl)ethylenediamine hydrochloride (a 40% methanol solution) were mixed and stirred (for seven minutes), and then, the whole quantity of the dispersion solution was charged thereinto. Subsequently, this mixed solution was stirred (for ten minutes), and then subjected to centrifugal separation (at 3500 rpm, for thirty minutes). Next, after decantation was performed, cleaning operation of redispersion in ethanol followed by centrifugal separation (at 3500 rpm, for thirty minutes) was repeated twice. Subsequently, after decantation, drying (for six hours) in a decompression environment (at room temperature) and then drying (for two hours) in a decompression environment (at 70° C.) were performed, so that a solid was obtained. Next, a solution B was obtained by adding 50 m$^3$ of toluene to the solid, and then stirred (for twelve hours) with a roll mill. The solution B was then moved into a three neck flask, and 0.5 g of acrylic acid and 2.0 g of 2,5-dimethyl-1,5-hexadiene were charged into the solution B. This solution B was then stirred (for twenty minutes) in a nitrogen gas stream. Next, after the solution B was further stirred (at 50° C. for twenty minutes), a solution C in which 0.01 g of AIBN was dissolved in 3 cm$^3$ of toluene was added thereto, and the solution B was then heated (at 65° C.). Subsequently, after being stirred (for one hour) and then cooled (to room temperature), this mixed solution was poured into a bottle together with ethyl acetate, and then subjected to centrifugal separation (at 3500 rpm, for thirty minutes). Next, following decantation, cleaning operation of redispersion in ethyl acetate followed by centrifugal separation (at 3500 rpm, for thirty minutes) was repeated three times. Subsequently, drying (for twelve hours) in a decompression environment (at room temperature) and then drying (for two hours) in a decompression environment (at 70° C.) were performed. As a result, black migrating particles made of a polymer coated pigment were obtained.

[Preparation of Insulating Liquid]

Next, as an insulating liquid, there was prepared an organic solvent containing: 1.0% in total of N,N-dimethylpropane-1,3-diamine, 12-hydroxy-octadecanoic acid, and methoxysulfonyloxymethane (Solsperse17000 made by The Lubrizol Corporation); 5.0% of Sorbitan Trioleate (Span 85); and 94% of isoparaffin (IsoparG made by Exxon Mobil Corporation) serving as a first ingredient. In this case, as necessary, 0.3 g of the migrating particles were subsequently added to 9.7 g of the insulating liquid, and this insulating liquid was stirred (for four hours) with a homogenizer to which zirconia beads (0.03 mmφ) were added. Subsequently, this mixture was subjected to centrifugal separation (at 2000 rpm, for five minutes). The mixture was then subjected to another centrifugal separation (at 4000 rpm, for five minutes) after the beads were removed, so that the insulating liquid in which the migrating particles were dispersed was obtained.

[Preparation for Porous Layer]

Next, as a material used to form fibrous structures, a solution D was prepared by dissolving 12 g of polyacrylonitrile (made by Sigma-Aldrich Co. LLC.: molecular weight=150000) in 88 g of N,N'-dimethylformamide. Subsequently, a spinning solution was prepared by adding 40 g of titanium oxide (TITONE R-42 made by Sakai Chemical Industry Co., Ltd.) forming non-migrating particles to 60 g of the solution D, and mixing this with a bead mill. The spinning solution was then put into a syringe, and spinning on a glass substrate, on which a pixel electrode (ITO) having a predetermined pattern was formed, was performed for twenty round trips by using an electric field spinning device (NANON made by Mecc Co., Ltd.). Spinning conditions were a field intensity=28 kV, a discharge speed=0.5 cm$^3$/m, a spinning distance=15 cm, and a scan rate=20 mm/s. The glass substrate was then dried in a vacuum oven (at 75° C.) for twelve hours, so that the fibrous structures including the non-migrating particles were formed.

[Assembly of Display Unit]

From the glass substrate on which the pixel electrode was formed, unnecessary fibrous structures attaching to a region where the pixel electrode was not formed were removed. Subsequently, a PET film (having a thickness of 30 μm) was placed as a spacer, on a glass substrate with a counter electrode (ITO) formed over the entire surface thereof. On this glass substrate, the glass substrate on which the pixel electrode and the fibrous structures were formed was stacked. It is to be noted that a photocurable resin (photoresistive resin Photolec A-400 made by Sekisui Chemical Co., Ltd.) containing beads (with an outer diameter=30 μm) was drawn at a position that the porous layer did not overlap. Finally, after the insulating liquid in which the electrophoretic particles were dispersed was injected into a space between the two glass substrates, the whole was pressed with a roller to bring the porous layer next to the pixel electrode and the counter electrode, and then, the porous layer was compressed by pressing the whole again.

Experimental Example 1-2

A display unit was produced using an insulating liquid which was prepared in a manner similar to the above-described experimental example 1-1 except the following. In this example, a mixture was subjected to centrifugal separation (at 2000 rpm, for five minutes), and then to another centrifugal separation (at 3000 rpm, for ten minutes) after beads were removed.

Experimental Example 1-3

A display unit was produced using an insulating liquid which was prepared in a manner similar to the above-described experimental example 1-1 except the following. In this example, a mixture was subjected to centrifugal separation (at 2000 rpm, for five minutes), and then to another centrifugal separation (at 4000 rpm, for two minutes) after beads were removed.

Experimental Example 1-4

A display unit was produced using an insulating liquid which was prepared in a manner similar to the above-described experimental example 1-1 except the following. In this example, a mixture was subjected to centrifugal separation (at 2000 rpm, for five minutes), and then to another centrifugal separation (at 4000 rpm, for ten minutes) after beads were removed.

Comparative Example 1-1

A display unit was produced by preparing a porous layer in a manner similar to the above-described experimental example 1-1 except the following. In this example, a mixture was subjected to centrifugal separation (at 2000 rpm, for five minutes), and then beads were removed.

Comparative Example 1-2

A display unit was produced using an insulating liquid which was prepared in a manner similar to the above-described experimental example 1-1 except the following. In this example, a mixture was subjected to centrifugal separation (at 2000 rpm, for five minutes), and then to another centrifugal separation (at 3000 rpm, for five minutes) after beads were removed.

The display unit in each of the experimental examples 1-1 to 1-4 and the comparative examples 1-1 and 1-2 has been examined in terms of black reflectance (%), white reflectance (%), contrast ratio, average particle size (nm) of electrophoretic particles, D90 (nm), and average pore size (μm) of porous layer, as performance thereof. Results of the examination as listed in Table 1 were obtained. It is to be noted that Table 1 also indicates values of A1 (=a/c) and A2 (=b/c).

TABLE 1

|  | Black Reflectance (%) | White Reflectance (%) | CR Ratio | Average Particle Size a (nm) | D90 b (nm) | Average Pore Size c (μm) | A1 (a/c) | A2 (b/c) |
| --- | --- | --- | --- | --- | --- | --- | --- | --- |
| Experimental Example 1-1 | 1.0 | 50 | 50 | 90 | 200 | 0.5 | 0.18 | 0.4 |
| Experimental Example 1-2 | 1.2 | 45 | 38 | 120 | 200 |  | 0.24 | 0.4 |
| Experimental Example 1-3 | 1.5 | 40 | 27 | 90 | 300 |  | 0.18 | 0.6 |
| Experimental Example 1-4 | 1.5 | 50 | 33 | 90 | 150 |  | 0.18 | 0.3 |
| Comparative Example 1-1 | 2.0 | 20 | 10 | 150 | 400 |  | 0.3 | 0.8 |
| Comparative Example 1-2 | 1.5 | 35 | 23 | 120 | 300 |  | 0.24 | 0.6 |

As for the black reflectance and the white reflectance, each reflectance in the normal direction of the substrate to a standard diffuser in ring illumination at 45 degrees to 0 degree was measured using a spectrophotometer (MCPD-7000 made by Otsuka Electronics Co., Ltd.). At this time, a voltage (a drive voltage=15 V) was applied over a sufficient period of time in a white display state, and the white reflectance and the black reflectance were measured in a state in which the reflectance was stable, and thereby a contrast ratio (white reflectance/black reflectance) was calculated. The particle size of the electrophoretic particles was measured by a laser Doppler method (a dynamic electrophoretic light scattering method) using ELSZ-1 (made by Otsuka Electronics Co., Ltd.). The average pore size of the porous layer was measured using a Perm-Porometer (Seika Corporation).

size of electrophoretic particles and D90, the greater the average pore size of the porous layer is, the further the white reflectance decreases as the density of the non-migrating particles falls. However, since the electrophoretic particles readily go through the porous layer, the black reflectance improves.

TABLE 2

| | Black Reflectance (%) | White Reflectance (%) | CR Ratio | Average Particle Size a (nm) | D90 b (nm) | Average Pore Size c (μm) | A1 (a/c) | A2 (b/c) |
|---|---|---|---|---|---|---|---|---|
| Experimental Example 2-1 | 1.5 | 30 | 20 | 150 | 400 | 1.0 | 0.15 | 0.4 |
| Experimental Example 2-2 | 3.0 | 25 | 8.3 | 200 | 600 | | 0.2 | 0.6 |
| Experimental Example 3 | 1.0 | 20 | 20 | 150 | 400 | 2.0 | 0.075 | 0.2 |

It is apparent from Table 1 that, when the experimental examples 1-1 to 1-4 are compared with the comparative examples 1-1 and 1-2, either or both of the black reflectance and the white reflectance in each of the experimental examples 1-1 to 1-4 is/are higher than that/those of each of the comparative examples 1-1 and 1-2. This is attributable to an improvement in passage of the electrophoretic particles. It is to be noted that in the experimental examples 1-1, 1-3, and 1-4, the average particle size "a" is equal to or less than one-fifth of the average pore size "c" (a/c≤0.2), and in the experimental examples 1-1, 1-2, and 1-4, the value "b" of D90 is equal to or less than a half of the average pore size "c" (b/c≤0.5). In addition, among these examples, the experimental examples 1-1 and 1-4 satisfy both of the respective numerical ranges of the average particle size "a" and the value "b" of D90.

Experimental Examples 2-1 and 2-2

Further, as an experimental example 2-1, a display unit was produced using an insulating liquid which was prepared in a manner similar to the above-described experimental example 1-1 except the following. In this example, after a mixture was subjected to centrifugal separation (at 2000 rpm, for five minutes), beads were removed without another centrifugal separation, and spinning for eight round trips was performed. Furthermore, as an experimental example 2-2, a display unit was produced using an insulating liquid which was prepared in a manner similar to the above-described experimental example 2-1 except the following. In this example, a mixture was not subjected to centrifugal separation, and beads were removed using a glass membrane filter (0.7 μm).

Experimental Example 3

Still furthermore, as an experimental example 3, a display unit was produced by preparing a porous layer in a manner similar to the above-described experimental example 2-1, except that spinning for four round trips was performed. Characteristics of these experimental examples 2-1, 2-2, and 3 are listed in Table 2. Display items, measurement techniques, and the like are similar to those of the above-described experimental example 1-1 and the like. In this way, the average pore size "c" of the porous layer may be 1.0 μm or 2.0 μm. Moreover, the following is apparent from the comparative example 1-1 as well as the experimental examples 2-1 and 3. When the examples are the same in terms of average particle The technology has been described with reference to the embodiment, but is not limited thereto and may be variously modified. For example, the electrophoresis device of the technology may be applied to not only a display unit but other types of electronic apparatuses.

It is to be noted that the technology may be configured as follows.

(1) An electrophoresis device including:
a plurality of electrophoretic particles and a porous layer that are contained in an insulating liquid, the porous layer being formed using a fibrous structure including a plurality of non-migrating particles, wherein
an average particle size of the electrophoretic particles is equal to or less than one-fifth of an average pore size of the porous layer.

(2) The electrophoresis device according to (1), wherein a value of D90 in a cumulative distribution of the average particle size of the electrophoretic particles is equal to or less than a half of the average pore size of the porous layer.

(3) The electrophoresis device according to (1), wherein the average pore size of the porous layer is about 0.15 μm or more and about 3 μm or less.

(4) The electrophoresis device according to (3), wherein the average pore size of the porous layer is about 0.3 μm or more and about 2 μm or less.

(5) The electrophoresis device according to any one of (1) to (4), wherein the average particle size of the electrophoretic particles is about 30 nm or more and about 300 nm or less.

(6) The electrophoresis device according to (5), wherein the average particle size of the electrophoretic particles is about 50 nm or more and about 200 nm or less.

(7) The electrophoresis device according to any one of (1) to (6), wherein a mean fiber diameter of the fibrous structure is about 10 μm or less.

(8) The electrophoresis device according to any one of (1) to (7), wherein the fibrous structure is formed of a polymer material or an inorganic material.

(9) The electrophoresis device according to any one of (1) to (8), wherein the fibrous structure is formed by an electrostatic spinning method.

(10) The electrophoresis device according to any one of (1) to (9), wherein the non-migrating particles have an optical reflecting property different from an optical reflecting property of the electrophoretic particles.

(11) The electrophoresis device according to any one of (1) to (10), wherein a reflectance of the non-migrating particles is higher than a reflectance of the electrophoresis device.

(12) An electrophoresis device including:
a plurality of electrophoretic particles and a porous layer that are contained in an insulating liquid, the porous layer being formed using a fibrous structure including a plurality of non-migrating particles, wherein
a value of D90 in a cumulative particle-size distribution of the electrophoretic particles is equal to or less than a half of an average pore size of the porous layer.

(13) The electrophoresis device according to (12), wherein the average pore size of the porous layer is about 0.15 μm or more and about 3 μm or less.

(14) The electrophoresis device according to (13), wherein the average pore size of the porous layer is about 0.3 μm or more and about 2 μm or less.

(15) The electrophoresis device according to any one of (12) to (14), wherein the value of D90 in the cumulative particle-size distribution of the electrophoretic particles is about 150 nm or more and about 600 nm or less.

(16) A display unit provided with an electrophoretic device between a pair of substrates each having an electrode, one or both of the substrates being optically transparent, the electrophoretic device including:
a plurality of electrophoretic particles and a porous layer that are contained in an insulating liquid, the porous layer being formed using a fibrous structure including a plurality of non-migrating particles, wherein
an average particle size of the electrophoretic particles is equal to or less than one-fifth of an average pore size of the porous layer.

(17) A display unit provided with an electrophoretic device between a pair of substrates each having an electrode, one or both of the substrates being optically transparent, the electrophoretic device including:
a plurality of electrophoretic particles and a porous layer that are contained in an insulating liquid, the porous layer being formed using a fibrous structure including a plurality of non-migrating particles, wherein
a value of D90 in a cumulative particle-size distribution of the electrophoretic particles is equal to or less than a half of an average pore size of the porous layer.

It should be understood by those skilled in the art that various modifications, combinations, sub-combinations, and alterations may occur depending on design requirements and other factors insofar as they are within the scope of the appended claims or the equivalents thereof.

What is claimed is:

1. An electrophoresis device comprising:
a plurality of electrophoretic particles and a porous layer that are contained in an insulating liquid, the porous layer being formed using a fibrous structure including a plurality of non-migrating particles,
wherein an average of a particle size of the electrophoretic particles is equal to or less than one-fifth of an average pore size of the porous layer, and
wherein a value of D90 in a cumulative distribution of the particle size of the electrophoretic particles is equal to or less than half of the average pore size of the porous layer.

2. The electrophoresis device according to claim 1, wherein the average pore size of the porous layer is about 0.15 μm or more and about 2 μm or less.

3. The electrophoresis device according to claim 2, wherein the average pore size of the porous layer is about 0.3 μm or more and about 2 μm or less.

4. The electrophoresis device according to claim 1, wherein the average particle size of the electrophoretic particles is about 30 nm or more and about 300 nm or less.

5. The electrophoresis device according to claim 4, wherein the average particle size of the electrophoretic particles is about 50 nm or more and about 200 nm or less.

6. The electrophoresis device according to claim 1, wherein a mean fiber diameter of the fibrous structure is about 10 μm or less.

7. The electrophoresis device according to claim 1, wherein the fibrous structure is formed of a polymer material or an inorganic material.

8. The electrophoresis device according to claim 1, wherein the fibrous structure is formed by an electrostatic spinning method.

9. The electrophoresis device according to claim 1, wherein the non-migrating particles have an optical reflecting property different from an optical reflecting property of the electrophoretic particles.

10. The electrophoresis device according to claim 1, wherein a reflectance of the non-migrating particles is higher than a reflectance of the electrophoresis device.

11. An electrophoresis device comprising:
a plurality of electrophoretic particles and a porous layer that are contained in an insulating liquid, the porous layer being formed using a fibrous structure including a plurality of non-migrating particles,
wherein a value of D90 in a cumulative particle-size distribution of the electrophoretic particles is equal to or less than half of an average pore size of the porous layer.

12. The electrophoresis device according to claim 11, wherein the average pore size of the porous layer is about 0.15 μm or more and about 3μm or less.

13. The electrophoresis device according to claim 12, wherein the average pore size of the porous layer is about 0.3 μm or more and about 2 μm or less.

14. The electrophoresis device according to claim 11, wherein the value of D90 in the cumulative particle-size distribution of the electrophoretic particles is about 150 nm or more and about 600 nm or less.

15. A display unit provided with an electrophoretic device between a pair of substrates each having an electrode, one or both of the substrates being optically transparent, the electrophoretic device comprising:
a plurality of electrophoretic particles and a porous layer that are contained in an insulating liquid, the porous layer being formed using a fibrous structure including a plurality of non-migrating particles,
wherein an average of a particle size of the electrophoretic particles is equal to or less than one-fifth of an average pore size of the porous layer, and
wherein a value of D90 in a cumulative distribution of the particle size of the electrophoretic particles is equal to or less than half of the average pore size of the porous layer.

16. A display unit provided with an electrophoretic device between a pair of substrates each having an electrode, one or both of the substrates being optically transparent, the electrophoretic device comprising:
a plurality of electrophoretic particles and a porous layer that are contained in an insulating liquid, the porous layer being formed using a fibrous structure including a plurality of non-migrating particles,
wherein a value of D90 in a cumulative particle-size distribution of the electrophoretic particles is equal to or less than half of an average pore size of the porous layer.

* * * * *